United States Patent
Kim et al.

(10) Patent No.: US 10,877,624 B2
(45) Date of Patent: Dec. 29, 2020

(54) METHOD FOR DISPLAYING AND ELECTRONIC DEVICE THEREOF

(71) Applicant: Samsung Electronics Co., Ltd., Gyeonggi-do (KR)

(72) Inventors: Ji-Hyun Kim, Gyeonggi-do (KR); Se-Jun Song, Seoul (KR); Young-Eun Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 14/893,674

(22) PCT Filed: Jul. 9, 2014

(86) PCT No.: PCT/KR2014/006159
§ 371 (c)(1),
(2) Date: Nov. 24, 2015

(87) PCT Pub. No.: WO2015/005674
PCT Pub. Date: Jan. 15, 2015

(65) Prior Publication Data
US 2016/0110035 A1  Apr. 21, 2016

(30) Foreign Application Priority Data
Jul. 10, 2013 (KR) .................. 10-2013-0080924

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0481* (2013.01); *G06F 3/0483* (2013.01);
(Continued)

(58) Field of Classification Search
CPC ..... G06F 3/0482; G06F 3/0483; G06F 3/0484
See application file for complete search history.

(56) References Cited

U.S. PATENT DOCUMENTS 6,697,838 B1 * 2/2004 Jakobson .......... G06F 17/30867
707/E17.109
8,868,598 B2 * 10/2014 Zhang ............... G06F 17/30905
707/769
(Continued)

FOREIGN PATENT DOCUMENTS

| CN | 101339448 A | 1/2009 |
| CN | 201299169 Y | 9/2009 |

(Continued)

OTHER PUBLICATIONS

Android, "Google Keep" [online], published on Mar. 20, 2013, Retrieved on Jan. 21, 2018 from https://www.youtube.com/watch?v=UbvkHEDvw-o (Year: 2013).*

(Continued)

*Primary Examiner* — Anil K Bhargava
(74) *Attorney, Agent, or Firm* — Cha & Reiter, LLC.

(57) ABSTRACT

An electronic device for recording and displaying memo objects and method executing the same are disclosed herein. The electronic devices includes a display and a processor. The processor is configured to execute steps implementing the method, including receive a memo object to a screen mode or a visual object presently displayed on the display when a memo input mode is active, store an association between the memo object and the presently displayed screen mode or visual object, and display the memo object on a memo layer disposed over the screen mode or visual object.

15 Claims, 17 Drawing Sheets

(51) Int. Cl.
*H04M 1/725* (2006.01)
*G06F 3/0483* (2013.01)
*G06F 3/0481* (2013.01)
*G06F 3/0484* (2013.01)

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04883* (2013.01); *H04M 1/72522* (2013.01); *G06F 2203/04803* (2013.01); *H04M 2250/68* (2013.01)

(56) References Cited

U.S. PATENT DOCUMENTS

| | | | |
|---|---|---|---|
| 2004/0078451 A1* | 4/2004 | Dietz | G06F 17/30884 709/217 |
| 2005/0091578 A1* | 4/2005 | Madan | G06F 17/241 715/201 |
| 2006/0218501 A1* | 9/2006 | Wilson | G06F 3/0486 715/769 |
| 2007/0266342 A1* | 11/2007 | Chang | G06F 17/30867 715/810 |
| 2008/0314941 A1 | 12/2008 | Knych et al. | |
| 2009/0312065 A1 | 12/2009 | Wang et al. | |
| 2012/0019487 A1 | 1/2012 | Kazamaki et al. | |
| 2012/0064947 A1 | 3/2012 | Yi et al. | |
| 2012/0174009 A1 | 7/2012 | Kwon | |
| 2012/0210201 A1 | 8/2012 | Kim et al. | |
| 2012/0319971 A1* | 12/2012 | Eguchi | G06F 3/04883 345/173 |
| 2013/0212535 A1* | 8/2013 | Kim | G06F 3/0482 715/841 |
| 2013/0263002 A1* | 10/2013 | Park | G06F 3/0484 715/719 |
| 2013/0283144 A1* | 10/2013 | Roh | G06F 17/241 715/230 |
| 2013/0321314 A1* | 12/2013 | Oh | G06F 3/041 345/173 |
| 2014/0122599 A1* | 5/2014 | Park | H04L 12/1818 709/204 |
| 2014/0123003 A1* | 5/2014 | Song | G06F 1/1626 715/701 |
| 2014/0132535 A1* | 5/2014 | Kim | G06F 3/04883 345/173 |
| 2014/0181686 A1* | 6/2014 | Shin | G06F 3/1454 715/748 |
| 2014/0253463 A1* | 9/2014 | Hicks | G06F 3/03545 345/173 |
| 2014/0282077 A1* | 9/2014 | Wilson | G06F 3/0482 715/751 |
| 2014/0313152 A1 | 10/2014 | Kim | |
| 2014/0372938 A1* | 12/2014 | Park | G06F 3/0488 715/793 |
| 2015/0026620 A1* | 1/2015 | Kwon | G06F 3/04845 715/770 |
| 2015/0143248 A1* | 5/2015 | Beechuk | H04L 67/10 715/739 |

FOREIGN PATENT DOCUMENTS

| | | |
|---|---|---|
| CN | 101605173 A | 12/2009 |
| EP | 0 612 006 A1 | 8/1994 |
| EP | 1 947 562 A2 | 7/2008 |
| EP | 2 428 919 A1 | 3/2012 |
| EP | 2 549 717 A1 | 1/2013 |
| KR | 10-2010-0063545 A | 6/2010 |
| KR | 10-2012-0026395 A | 3/2012 |
| KR | 10-2012-0091826 A | 8/2012 |
| KR | 10-2013-0010577 A | 1/2013 |

OTHER PUBLICATIONS

Wikipedia, "Microsoft Notepad", accessed on Jul. 26, 2018, https://en.wikipedia.org/wiki/Microsoft_Notepad (Year: 2018).*
English Oxford Living Dictionaries, "translucent", accessed on Jul. 26, 2018, https://en.oxforddictionaries.com/definition/us/translucent (Year: 2018).*
Wikipedia, "Window decoration", published on Nov. 9, 2011, http://en.wikipedia.org/wiki/Window_decoration (Year: 2011).*
Delighted Robot, Evernote Handwriting App for Android, published on Aug. 1, 2011, [online] https://www.youtube.com/watch?v=KhADNUwSqJc (Year: 2011).*
European Search Report dated Jan. 25, 2017.
Chinese Search Report dated Jan. 2, 2018.
European Search Report dated Jun. 25, 2019.
Australian Search Report dated Jul. 29, 2019.
Australian Search Report dated Nov. 4, 2019.
Korean Search Report dated Nov. 26, 2019.
Australian Search Report dated Feb. 27, 2019.
Vietnamese Search Report dated Apr. 28, 2020.
Korean Search Report dated May 25, 2020.
European Search Report dated Feb. 20, 2020.
Brazilian Search Report dated Apr. 13, 2020.
Indian Search Report dated Jul. 14, 2020.

* cited by examiner

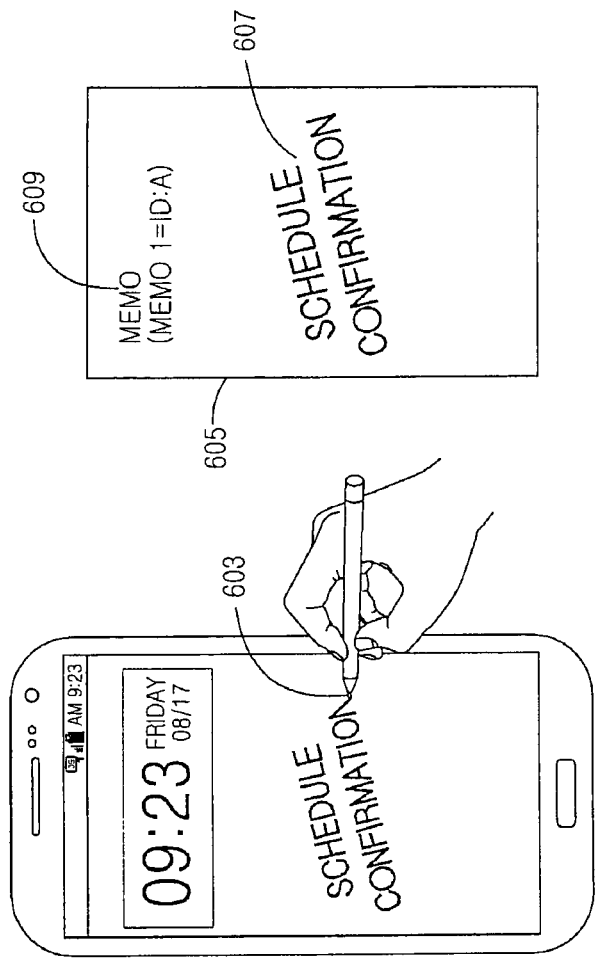
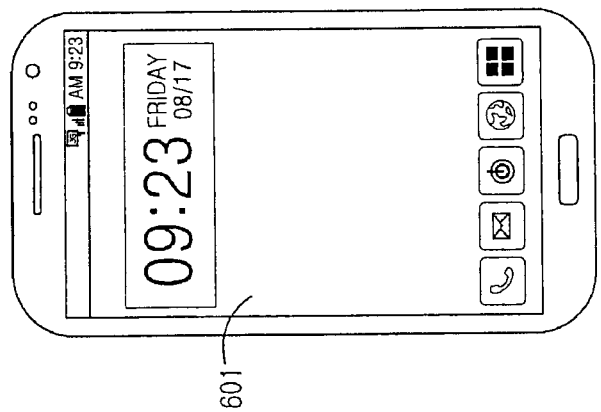
FIG. 6A  FIG. 6B  FIG. 6C

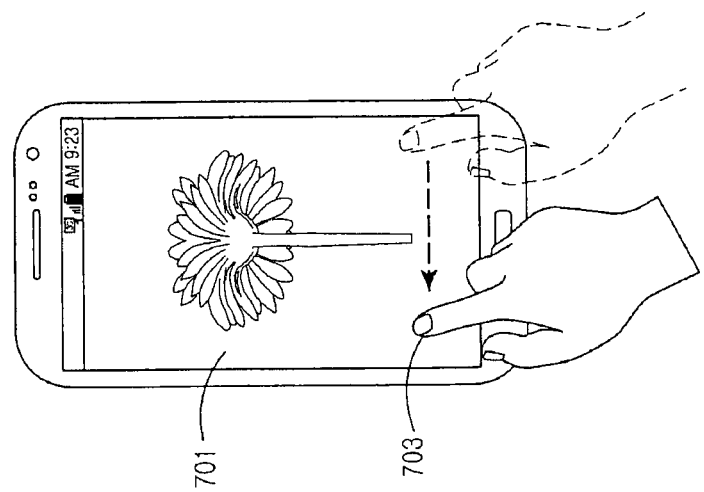
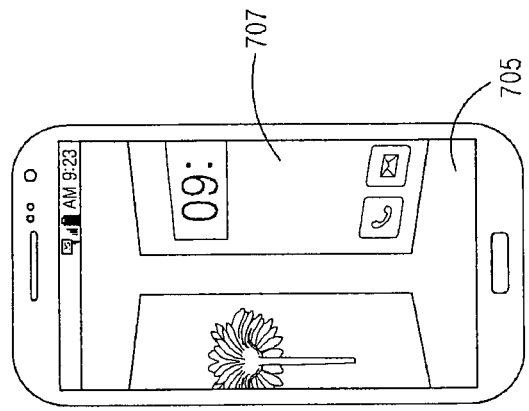
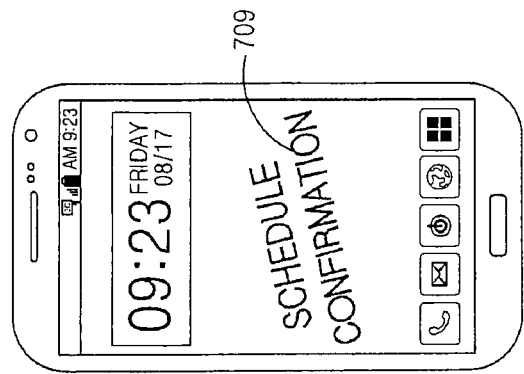
FIG. 7A
FIG. 7B
FIG. 7C

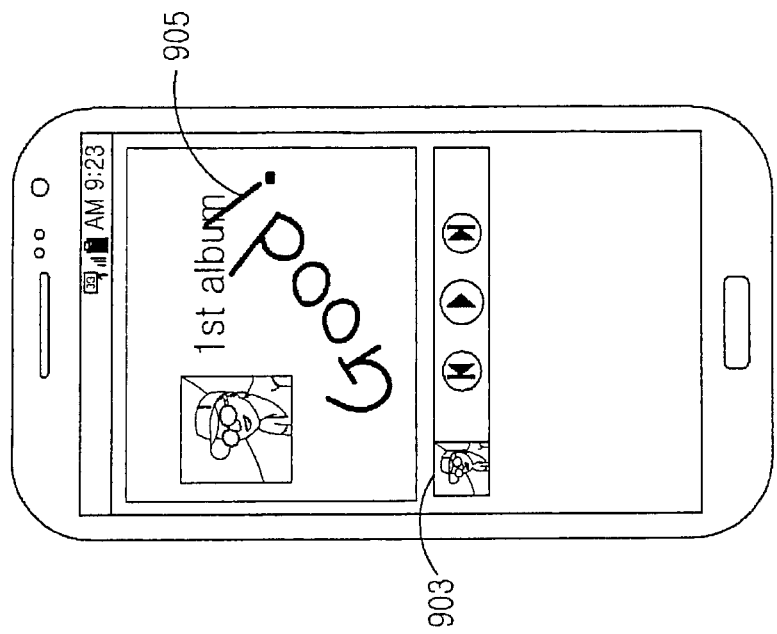
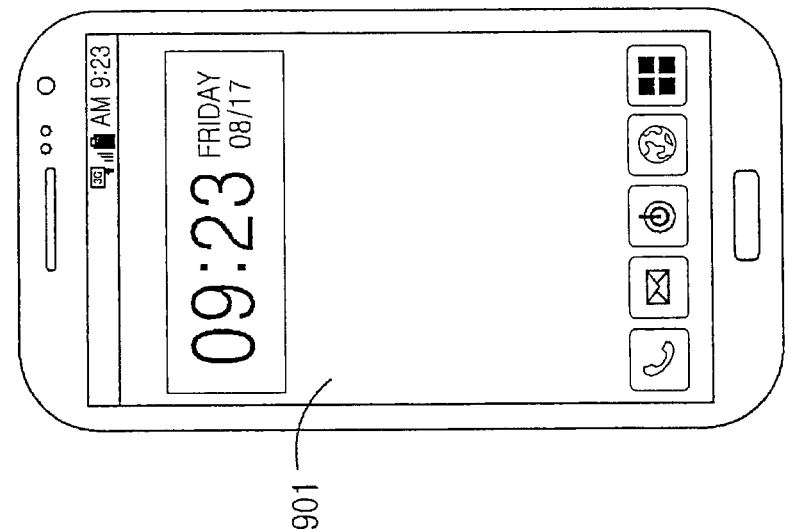
FIG. 9A
FIG. 9B

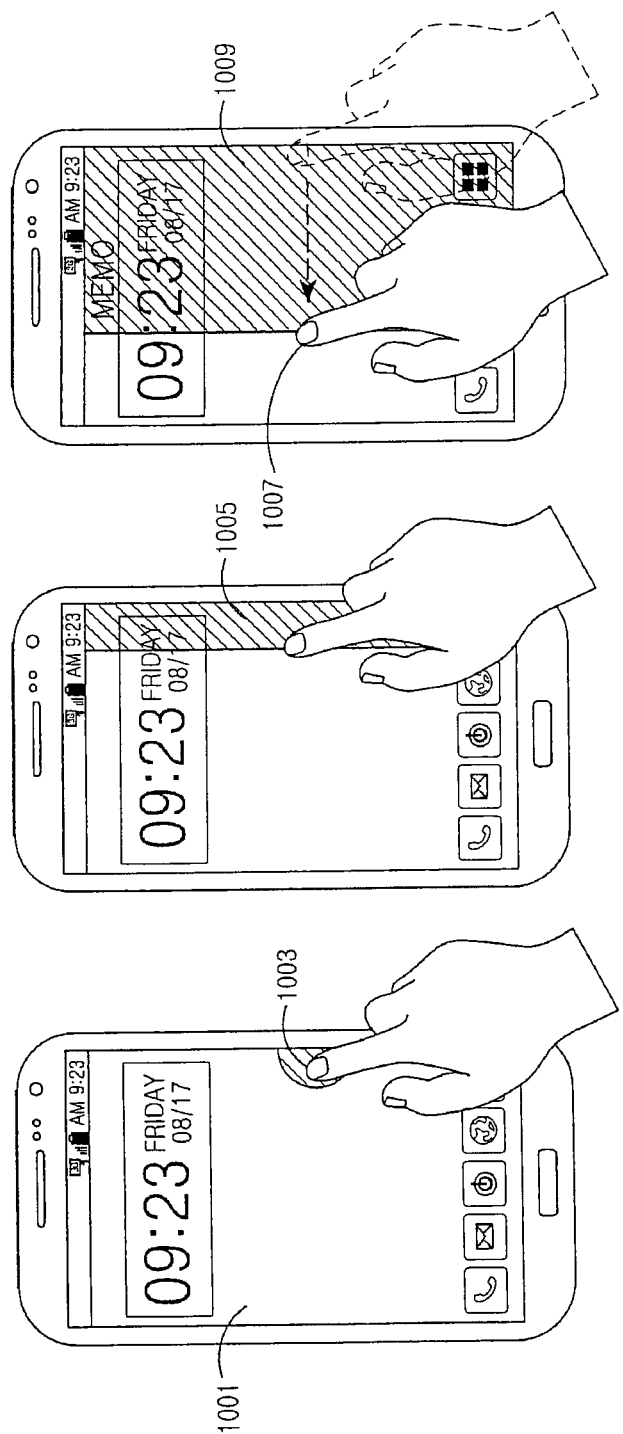

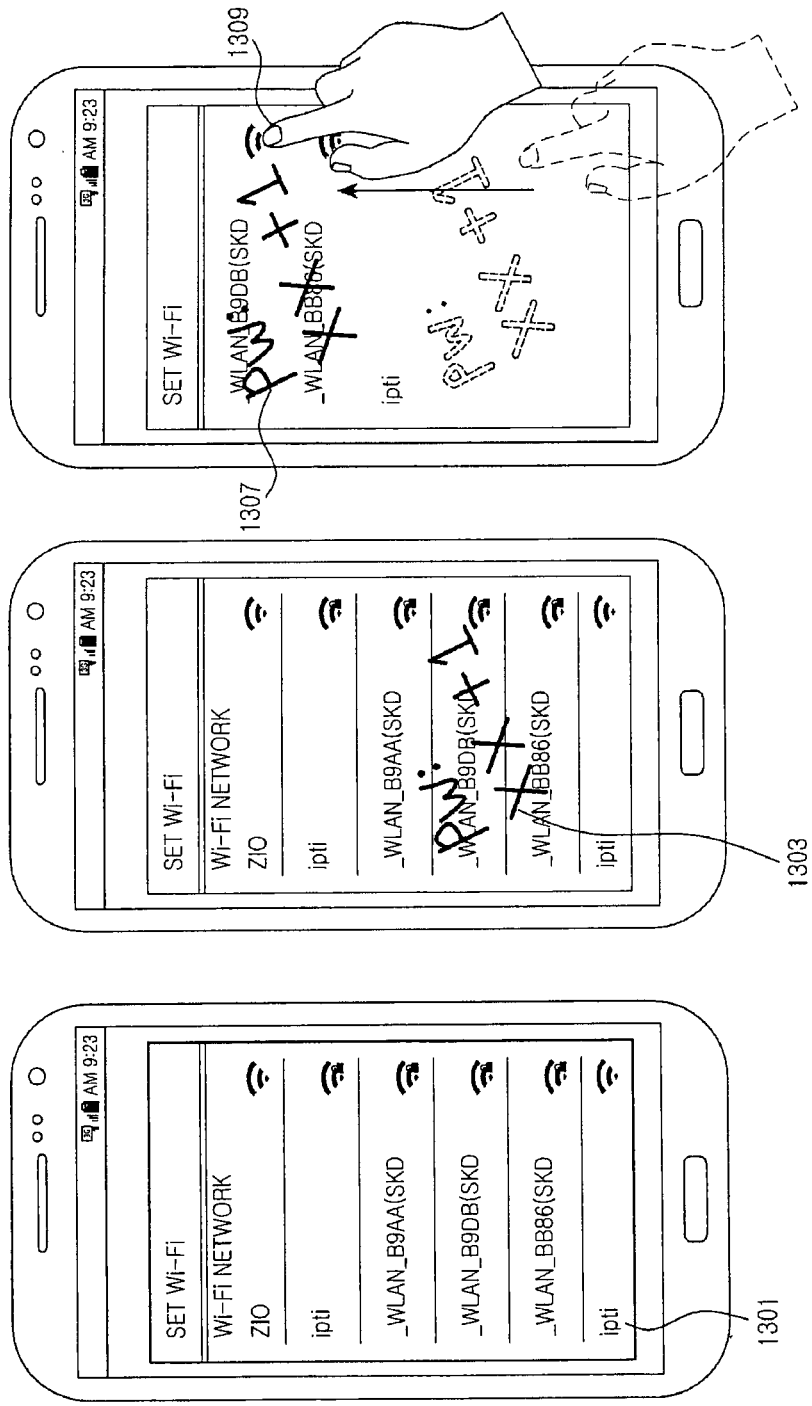

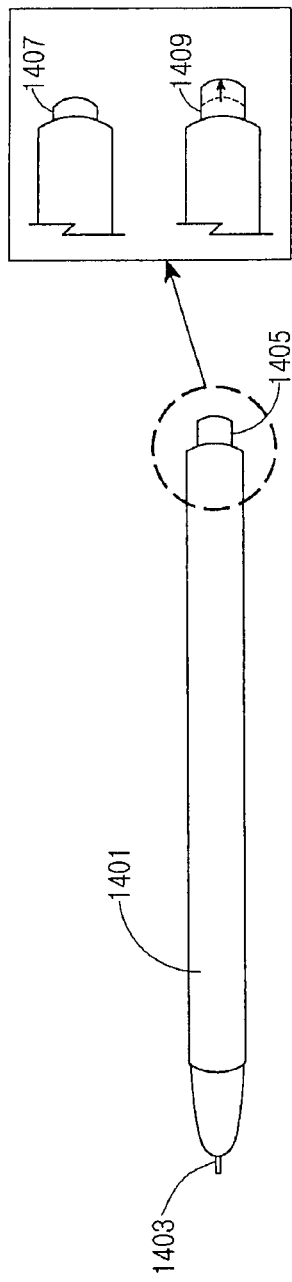
FIG. 14A
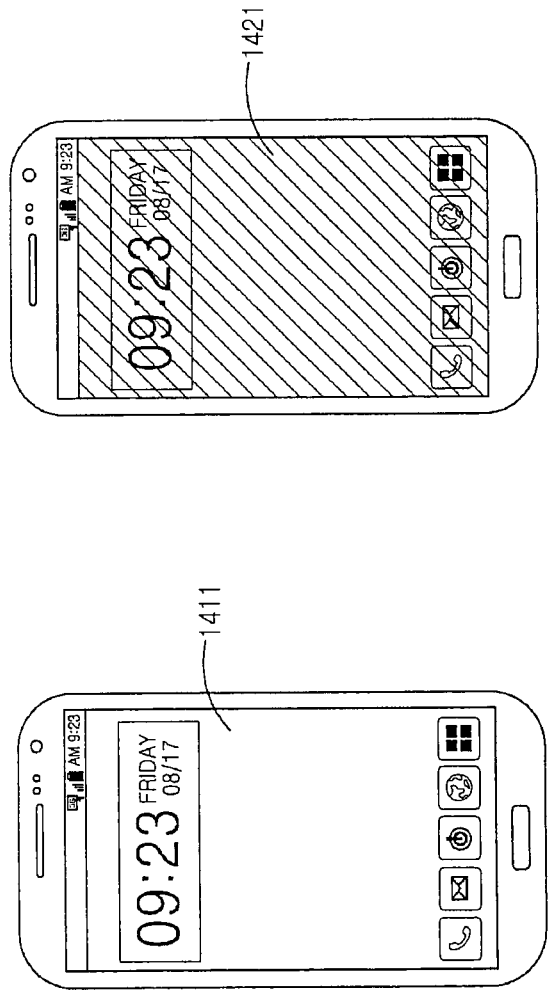
FIG. 14B
FIG. 14C

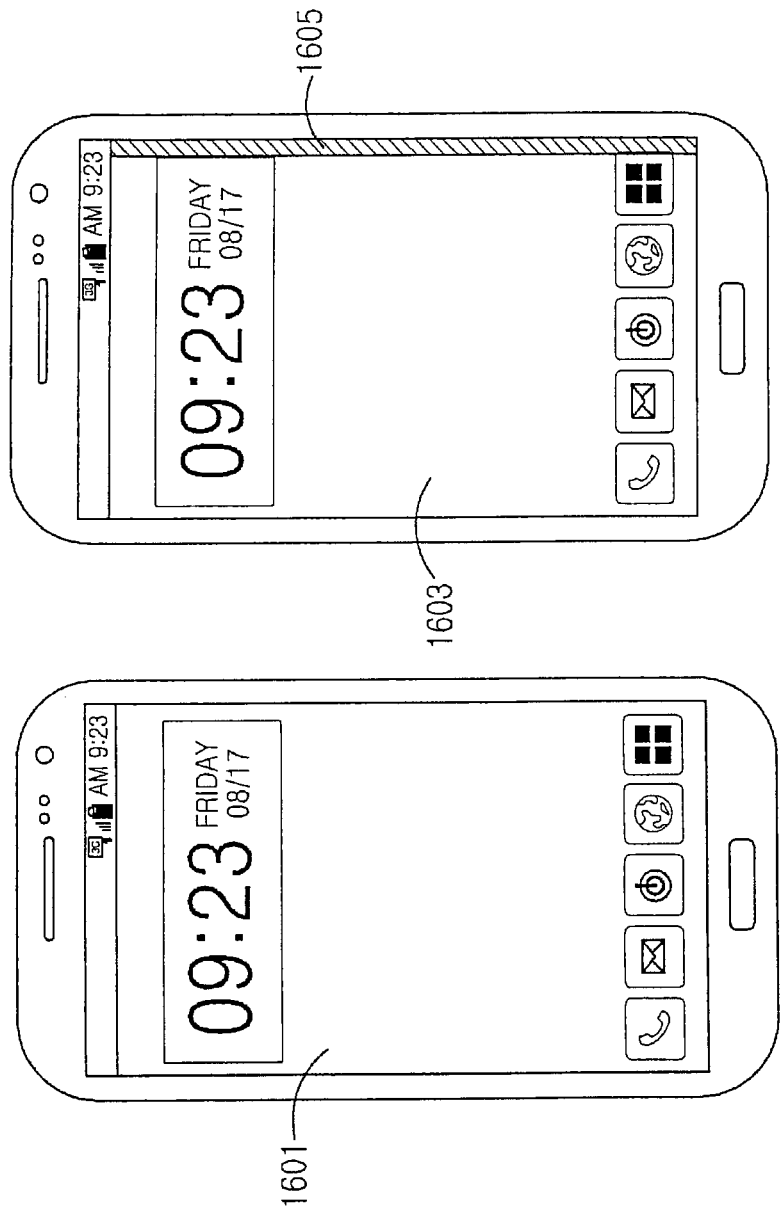

METHOD FOR DISPLAYING AND ELECTRONIC DEVICE THEREOF

CLAIM OF PRIORITY

This application is a National Phase Entry of PCT International Application No. PCT/KR2014/006159, which was filed on Jul. 9, 2014, and claims a priority to Korean Patent Application No. 10-2013-0080924, which was filed on Jul. 10, 2013, the contents of which are incorporated herein by reference.

TECHNICAL FIELD

The present disclosure relates generally to memo functions for electronic devices, and, more particularly to an electronic device and method for receiving, storing and displaying a memo.

BACKGROUND

Recently, due to rapid development of electronic devices, information or data exchangeable electronic devices are variously used. Generally, the electronic device includes a display unit and an input unit. Such an electronic device may provide a character input function such as a document preparing function or message writing function. In addition the electronic device may also provide a memo function for writing a brief article to assist user's memory.

Generally, the memo function is provided in an application type and a memo corresponding to an input may be written in a state where the application providing the memo function is executed. In addition, in order to confirm a written and stored memo, the application through which the memo is written is executed and then the memo desired to be confirmed may be loaded. An electronic device providing such a memo function may store memo creation time information together during storing the memo.

SUMMARY

Accordingly, an object of the present disclosure is to provide an apparatus and method for enhancing a memo function of an electronic device. Another object of the present disclosure is to provide an apparatus and method for creating and managing a memo screen for each screen in an electronic device. Another object of the present disclosure is to provide an apparatus and method for displaying together a memo screen corresponding to a screen displayed at the time of screen change in an electronic device. Another object of the present disclosure is to provide an apparatus and method for allowing a memo screen to be controlled according to a screen control in an electronic device.

In one aspect of the disclosure, an electronic device for recording and displaying memo objects and method executing the same are disclosed herein. The electronic devices includes a display and a processor. The processor is configured to execute steps implementing the method, including receive a memo object to a screen mode or a visual object presently displayed on the display when a memo input mode is active, store an association between the memo object and the presently displayed screen mode or visual object, and display the memo object on a memo layer disposed over the screen mode or visual object.

In one aspect of the disclosure, a display method of an electronic device is disclosed herein. The method includes receiving a memo object to a screen mode or a visual object presently displayed on a display of the electronic device when a memo input mode is active, storing an identifier associating the memo object and the presently displayed screen mode or visual object, and displaying the memo object on a memo layer disposed over the screen mode or visual object.

In one aspect of this disclosure, a non-transitory computer readable medium having a program recorded thereon, which, when executed by a computer, performs when a memo input mode is active, receiving a memo object to a screen mode or a visual object presently displayed on a display of an electronic device, storing an identifier associating the memo object and the presently displayed screen mode or visual object, and displaying on the display the memo object on a memo layer disposed over the screen mode or visual object.

BRIEF DESCRIPTION OF THE DRAWINGS

The present disclosure will become more apparent from the following detailed description when taken in conjunction with the accompanying drawings in which:

FIGS. 6A, 6B and 6C are illustrating an example operation for creating a memo screen in an electronic device according to an embodiment of the present disclosure;

FIGS. 7A, 7B and 7C are illustrating an example memo display operation in an electronic device according to an embodiment of the present disclosure;

FIGS. 9A and 9B are illustrating an example memo display operation in an electronic device according to an embodiment of the present disclosure;

FIGS. 10A, 10B and 10C are illustrating an example operation of creating a memo screen in an electronic device according to an embodiment of the present disclosure;

FIGS. 13A, 13B and 13C are illustrating an example screen control operation of an electronic device according to an embodiment of the present disclosure;

FIGS. 14A, 14B and 14C are illustrating an example operation for creating a memo screen in an electronic device according to an embodiment of the present disclosure;

FIGS. 16A and 16B are illustrating a screen of an example electronic device according to an embodiment.

DETAILED DESCRIPTION

Figure 1:
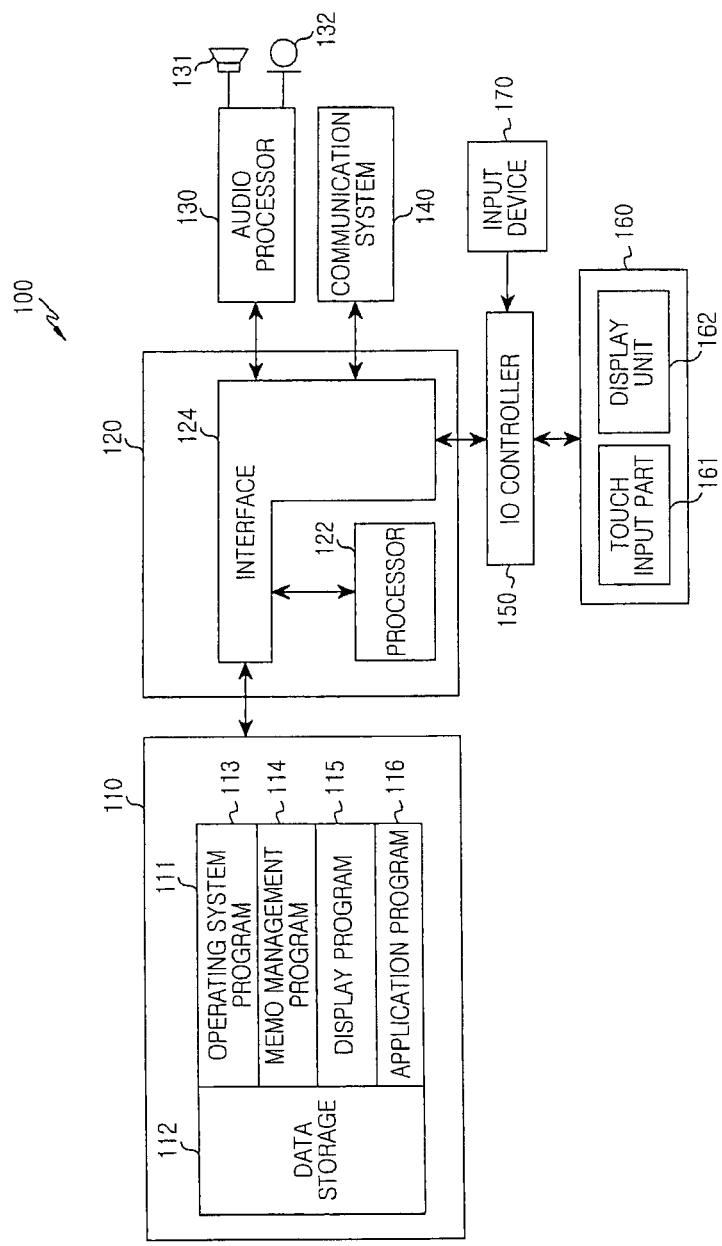
FIG. 1 is a block diagram illustrating an example configuration of an electronic device according to an embodiment of the present disclosure.

Example embodiments of the present disclosure will be described herein below with reference to the accompanying drawings. In the following description, detailed descriptions of well-known functions or implementations will be omitted since they would obscure the disclosure in unnecessary detail. Also, the terms used herein are defined according to the functions of the present disclosure. Thus, the terms may vary depending on a user or operator's intentions or practices. Therefore, the terms used herein may be understood based on the descriptions made herein.

A touch screen recently used in various ways is an input or display apparatus performing input and display of information with one screen. Accordingly, when the touch screen is employed, the electronic device may increase a display area by removing a separate input device such as a key pad. For example, when a full touch scheme that the touch screen is applied to an entire screen is used, a screen size may be enlarged by using the front surface of the electronic device as a screen.

In addition, an electronic device including the touch screen may create a memo to which an object, such as a text, number, figure or graph, is added by an input by using an input unit like a stylus pen or an electronic pen, an input by using a finger, a specific input received through a speech command or other sensors.

Typically, the memo may be created in a state where a specific application such as a document preparing application is executed. As an example, the electronic device does not create the above-described memo by capturing an image of the present state of the electronic device (e.g., where a web page is displayed by using a web browser or a home screen is displayed) and then create a memo by overlaying a memo object on the stored image (such as a bit of text, one or more numbers, a figure, or a graph). There is a limitation that, in order to create a memo, an application providing a memo writing function must first be executed. Hereinafter, in various embodiments of the present disclosure, a memo corresponding to the screen may be created without the need to execute a memo application or a document-creation application.

The electronic device may create a memo screen allowing an object to be added to each displayable screen mode or a portion of a displayed screen, such as a visual element displayed on the screen. The electronic device may store the memo object by mapping the created memo to the screen or visual element on which the memo was created and store the mapped result.

Additionally, the electronic device may map the created memo (or a memo screen) into an element of a screen on which the memo is created and store the mapped result. The electronic device may display a memo (or a memo screen) corresponding to a screen together with the screen to be displayed at the time of screen change. At this point, the electronic device may retrieve the memo (or a memo screen) corresponding to an identifier of a screen to be displayed among a plurality of stored memos, and display the memo.

In addition, the electronic device may be a portable electronic device such as a portable terminal, mobile terminal, media player, tablet computer, handheld computer, or Personal Digital Assistant (PDA). Furthermore, the electronic device may be an arbitrary portable electronic device including a device wherein two or more functions are combined from among the above-described devices. According to another embodiment, the electronic device may include any kind of electronic device including a display and an input unit. For example, the electronic device may include a desktop computer, a refrigerator, a multi-function peripheral, a video game console, a digital camera, a mobile internet device (MID), an Ultra Mobile PC (UMPC), a navigator, a smart TV, a digital watch, and an MP3 player.

In the embodiment, an electronic device including a touch screen is described. However, even though a touch screen is not included, it may be easily understood to those skilled in the art that the embodiment described herein may be properly applied even to an electronic device or a computing device having an input unit different from a display. Furthermore, the memo described in the embodiment may have the same meaning as a document, memo data, a character, or a message.

FIG. 1 is a block diagram illustrating an example configuration of an electronic device according to an embodiment. As illustrated in FIG. 1, an electronic device 100 may include a memory 110, a processor unit 120, an audio processing unit 130, a communication system 140, an input and output control module 150, a touch screen 160, or an input device 170. Among such a configuration, at least one configuration may be in plurality. Each element is described as follows.

The memory 110 may include a program storage unit 111 storing a program for controlling operations of the electronic device 100 or a data storage unit 112 storing data created during performing the program. For example, the data storage unit 112 may store various updatable storage data such as a phone book, an outgoing message or an incoming message, and store an identifier for a displayable screen. In addition, the data storage unit may store a memo screen corresponding to the displayable screen. That is, the data storage unit 112 may store an identifier identifying a home screen, an application list screen, an application execution screen, or a lock screen and a memo screen created for each screen.

The program storage unit 111 may store programs including an operating system program 113, a memo management program 114, a display program 115, and at least one application program 116. Here, the programs stored in the program storage unit 111 may be represented with instruction sets. In addition, the programs stored in the program storage unit 111 may be configured with modules allowing each function to be performed.

The operating system program 113 may include various software elements controlling a general system operation. Such a general system operation control may mean, for example, memory control or management, storage hardware (device) control or management, or power control or management. This operating system program 113 may perform a function of enabling free communication between various hardware (devices) and program elements (modules).

The memo management program 114 may detect an input generated through an input unit such as a finger, keyboard, keypad, trackball, or voice or a specific input received by other sensors, create a memo, or retrieve a created memo.

The memo management program 114 creates a memo screen for each displayable screen and then adds an object for the input detected on the screen to the created memo. In addition, the memo management program 114 creates a memo screen for elements configuring the screen and then adds an object for the input detected on the screen to the memo screen.

The memo management program 114 may be configured to perform a number of other operations. For example, the memo management program 114 may manage by mapping an identifier given for each screen to a memo screen of the corresponding screen. The memo management program 114 may retrieve a memo screen to be displayed together with a screen to be displayed. The memo management program 114 may control the displayed memo screen by detecting an input. As an example, the memo management program 114 may stop displaying a memo screen, resize the memo screen, or change a position of the memo screen.

The display program 115 may include various software elements for providing and displaying graphics on the touch screen 160. The term graphics may be used as meaning such as a text, web page, icon, digital image, video, or animation. In addition, the display program 115 may include various software elements related to a user interface. The display program 115 may display a memo creation operation adding an object according to an input, or an operation of displaying a memo screen through a screen change. That is, when an input for adding an object is detected, the display program 115 may display a memo screen on a screen and display an operation that the object is added to the displayed memo screen.

Furthermore, when an input for changing the displayed screen is detected, the display program 115 may display a memo screen corresponding to the changed screen on the changed screen. Here, the changing of the displayed screen may include a situation that a display unit operates and a screen is displayed, or a situation that the displayed screen is changed into another screen.

Furthermore, the display program 115 may display an operation of resizing a memo screen with respect to a screen, an operation of displaying or stopping display of a memo screen, or an operation of controlling a memo screen like a scroll operation of the memo screen.

The application program 116 may include software elements for at least one application program installed in the electronic device 100 and also include a program for creating and managing a memo screen for each screen. That is, a function of creating and displaying a memo for each screen may be provided as one application.

The processor unit 120 may include at least one processor 122 or interface 124. Here, the processor 122 or the interface 124 may be integrated at least one integrated circuit or implemented in separate elements.

The interface 124 may perform a role of a memory interface controlling accesses to the processor 122 and memory 110. In addition, the interface 124 may perform a role of a peripheral device interface controlling connection between input/output peripheral devices of the electronic device 100 and the processor 122.

The processor 122 may create a memo screen for each screen by using at least one software program and control the memo screen so as to be displayed together at the time of screen change. At this point, the processor 122 may include a processor executing at least one program stored in the memory 110 and controlling so as to perform a function corresponding to the program.

That is, the memo function of the electronic device 100 may be performed by using the same software as that stored in the memory 110 or the same hardware as the processor.

The audio processor 130 may provide an audio interface between a user and the electronic device 100 through a speaker 131 or a microphone 132.

The communication system 140 may perform a communication function for voice communication or data communication of the electronic device 100. At this point, the communication system 140 may be divided into a plurality of communication sub-modules supporting different communication networks. For example, the communication network may include, but is not limited to, a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network or a Near Field Communication (NFC) network.

The input/output control module 150 may provide an interface between an input/output device such as the touch screen 160 or the input device 170 and an interface.

The touch screen 160 is an input/output device performing information display or information input and may include a touch input unit 161 and a display unit 162.

The touch input unit 161 may provide touch information detected by a touch panel to the processor unit 120 through the input/output control module 150. At this point, the touch input unit 161 changes touch information into an instruction structure such as "touch_down, touch_move or touch_up" and provides it to the processor unit 120, and detects an input for creating a memo screen, or an input for an object to be added to the memo screen and provides the detected input to the processor unit 120.

In addition, the touch input unit 161 may detect an input for controlling the memo screen and provide the detected input to the processor unit 120.

The display unit 162 may display such as state information on the electronic device 10, characters that the user inputs, moving pictures or still images. For example, the display unit 162 may display a memo creation operation of adding an object according to an input or an operation of displaying the memo screen by a screen change.

When an input for adding an object is detected, the display unit 162 may display a memo screen on a screen and display an operation that adds an object to the displayed memo screen. In addition, when an input for changing the displayed screen is input, the display unit 162 may display the memo screen corresponding to the changed screen on the changed screen.

Furthermore, the display unit 162 may display an operation of controlling a memo screen, such as an operation of resizing the memo screen for a screen, an operation of displaying the memo screen or stopping display of the memo screen, or an operation of scrolling the memo screen.

The input device 170 may provide input data generated by user's selection to the processor unit 120 through the input/output control module 150. For example, the input device 170 may be configured with a control button for controlling the electronic device 100, and provide an input for creating a memo screen, or an input for an object to be added to the memo screen to the processor unit 120. In addition, the input device 170 may provide an input for allowing the memo screen to be controlled to the processor unit 120.

Although not shown in the drawing, the electronic device 100 may include elements for providing additional functions such as a broadcast receiving module for receiving broadcast, a digital sound source playing module such as an MP3 module, a short range wireless communication module for short range wireless communication, an image sensor for obtaining image data, or a proximity sensor module for proximity sensing, and may further include software for operations thereof.

The electronic device described in this embodiment may include the following various embodiments. The electronic device includes a display and a processor, and the processor adds an object on a screen in response to an input, and may store the displayed screen in association with the added object. The processor may display an object add screen corresponding to a screen on a portion of the displayed screen or on the entire displayed screen and allow an object to be added to the object add screen. The object add screen may be a region to which an object corresponding to an input detected on the displayed screen is addable. The processor may call an object corresponding to a screen to be displayed and display the called object on a portion of a screen or on an entire screen. The processor may map an identifier for the entire screen or a portion of the screen to an object or an object add screen and store the mapped result. The processor may detect an input and display the object add screen or stop display of the object add screen. The process may resize the object add screen. The processor may create the object add screen with respect to at least any one of a home screen, an application execution screen, and a lock screen, and add an object to the created object add screen. The object may include at least any one of a figure, a number, a text, audio content, and image content. The processor may detect a pre-defined input in a state where a screen is displayed and create an object add screen.

Figure 2:
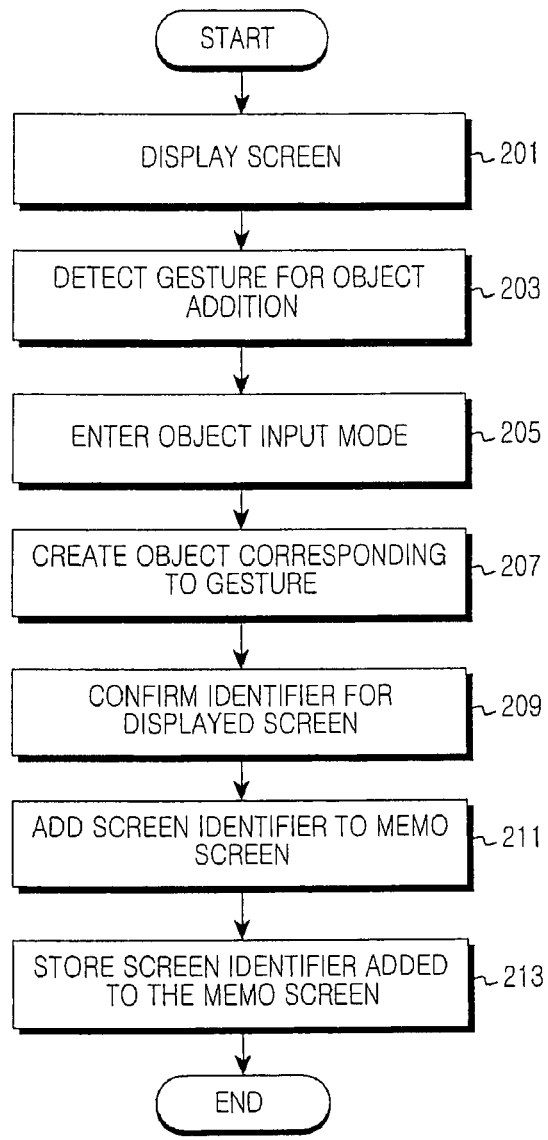
FIG. 2 is a flowchart illustrating an example memo creation operation in an electronic device according to an embodiment of the present disclosure.

FIG. 2 is a flowchart illustrating an example memo creation operation in an electronic device according to an embodiment of the present disclosure.

Referring to FIG. 2, the electronic device may display a screen in operation 201. Here, the screen may include various screens displayable by the electronic device as well as a home screen, an application execution screen, and a lock screen. The electronic device may confirm whether a gesture for object addition is detected in operation 203. The gesture for object addition is a user input for adding an object to a memo screen, and may be an input for requesting a memo screen creation. The memo screen is a screen to which an object is addable by the user's gesture and may be defined as an object add screen.

The gesture for the object addition may be an input in a pre-defined type with respect to the displayed screen. In addition, the gesture for the object addition may be generated through an input unit such as a trackball, thumb stick, electronic pen, mouse, voice or specific input received by other sensors as well as an input to the touch screen. For example, the electronic device may support an input unit of an electronic pen and attach, to the input unit, a button generating input data allowing a memo screen for the object addition to be executed.

When the gesture for the object addition is detected in operation 205, the electronic device may enter an object input mode in which an object is addable to the executed memo screen. The object addable to the memo screen includes a figure, a number, or a text, and such an object may be added by a manual input or an input through a keyboard displayed on a screen. As described above, the object may also be added by an input unit such as a keyboard, digital glove, or joystick.

The electronic device may enter the object input mode by creating and displaying a memo screen represented in a layer type. The electronic device may also display various memo screens in a popup type, or multi-window type. In addition, the electronic device may detect the gesture of the object addition in a state of entering the object input mode. Here, the gesture is an input representing a type of an object desired to be added and may be a gesture for inputting a text to a touch screen or a gesture for drawing a figure on the touch screen.

The electronic device may create an object corresponding to a user's gesture in operation 207. Here, the creating of an object corresponding to the gesture may be to add an object corresponding to the input to the displayed memo screen. An object may be, for example, a drawing or input of text, or some other indicator of information the user desires to recall later.

The electronic device may confirm an identifier for the displayed screen in operation 209. The electronic device may manage elements for a screen, after the identifier is differently defined for each screen. Here, the screen elements may include a configuration object such as a button, text, or image included in the screen and a layout included in such a configuration element. The configuration object may be represented as a view, and the layout may be represented as a view group, or a dock. In addition, the electronic device may assign an identifier to each configuration object and/or each layout and manage them.

In case of a typical home screen, for example, the electronic device may assign an identifier to a home screen and the home screen to which the identifier is assigned includes various icons and/or widgets for executing functions. These icons and/or widgets may be the configuration objects, and a region in which the configuration objects are disposed may be the layout. The electronic device may also assign different identifiers to icons and/or widgets configuring the home screen.

The electronic device may add a screen identifier to a memo screen in operation 211. The screen identifier is utilized to manage a memo created for each screen, and the electronic device may map an identifier of a screen that an input for adding an object to a memo screen is detected into the memo screen to which the object is added. The electronic device may display a memo screen for the displayed screen together by using a screen identifier during displaying the screen.

The electronic device may store a memo screen to which a screen identifier is added in operation 213. Although a memo screen corresponding to a screen is created by using an identifier for the screen, the electronic device described in this embodiment may create a memo screen corresponding to a configuration object and/or a layout by using an identifier for the configuration object and/or layout of a screen. In addition, the electronic device may create a memo screen corresponding to a screen size and create a memo screen corresponding to the configuration object and/or layout. That is, the electronic device may resize a memo screen to which the object is addable.

In another example, the memo screen is a screen to which an object is addable, and may be defined as an object add screen, and the object may include audio content, image content, or video content connectable to the displayed screen.

An electronic device according to various embodiments may store content selected by a user together with an identifier for a screen. For example, the electronic device may connect a screen identifier to audio content and manage the screen identifier, and allow the audio content corresponding to the identifier of the displayed screen to be played during displaying the screen.

Figure 3:
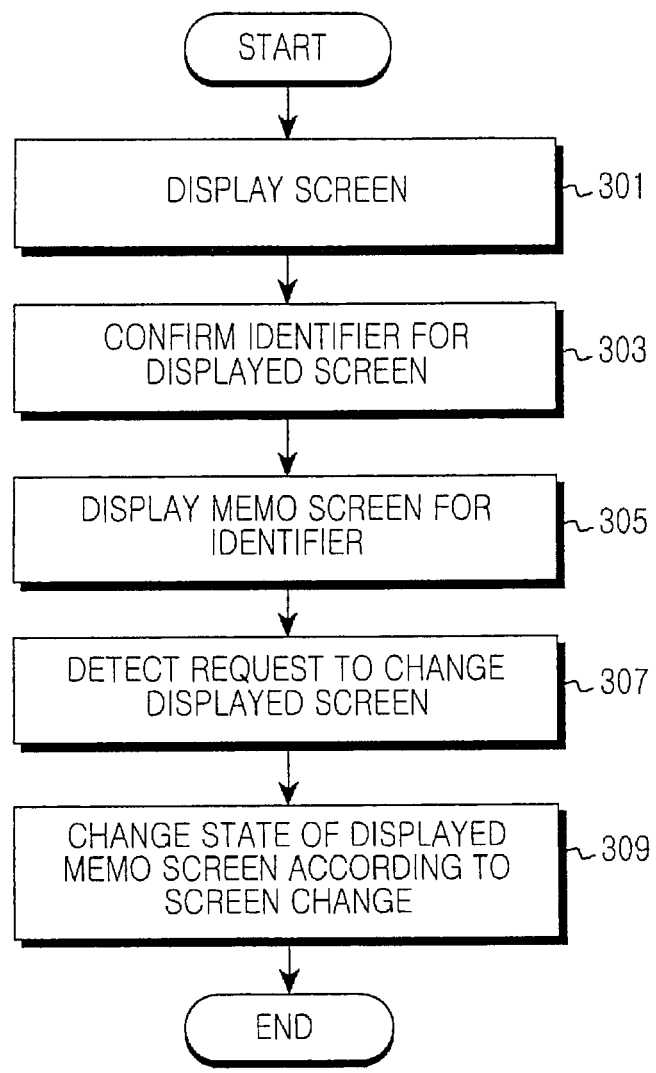
FIG. 3 is a flowchart illustrating an example memo display operation in an electronic device according to an embodiment of the present disclosure.

FIG. 3 is a flowchart illustrating an example memo display operation of an electronic device according to an embodiment. Referring to FIG. 3, the electronic device may display a screen in operation 301. Here, the screen may include not only a home screen, an application list screen, an application execution screen, or a lock screen, but also various screens to be displayable by the electronic device. In addition, the electronic device may detect an input and change a displayed screen into another screen.

In addition, the electronic device may confirm an identifier for the displayed screen or a screen to be displayed in operation 303. Here, the electronic device may manage elements for the screen by using the screen identifier. The managing of the elements for the screen using the screen identifier may be used to display a screen including elements by using an identifier of a screen to be displayed. For example, when detecting a request for a screen change in a currently displayed screen, the electronic device may display, in one screen, elements for a screen to be changed by using an identifier of a screen corresponding to a change direction. Furthermore, the electronic device may store a memo created for each screen after defining a memo screen for each screen. Such a memo may be discriminated by a screen identifier.

The electronic device may also confirm a memo screen corresponding to an identifier of a displayed screen or a screen to be displayed, and display the memo screen on a current screen in operation 305. At this point, the electronic device may call and display a memo screen corresponding to an identifier of a screen to be displayed from among memo screens for pre-stored various screens.

The electronic device may detect a request (i.e., input) for changing a screen on which a memo screen is displayed in operation 307. Here, the changing of the displayed screen may be a situation where the displayed screen is scrolled by a scroll input. In addition, the changing of the displayed screen may be that the displayed screen is changed into another screen by a panning input. The memo screen is to be displayed at a position created by the user. Due to this, the electronic device may change a position and/or a direction of the memo screen according to the screen change. For example, when the displayed screen is scrolled, the memo screen may be scrolled according to the position/direction of the scrolled screen.

The electronic device may change a state of the displayed memo screen according to the screen change in operation 309. A new memo object associated with the newly displayed screen may thus be displayed when the screen is changed by the user input. If no memo object is associated with the newly displayed screen, no memo object may be displayed, in which case the electronic device may detect an input and process the displayed memo screen to disappear.

Figure 4A:
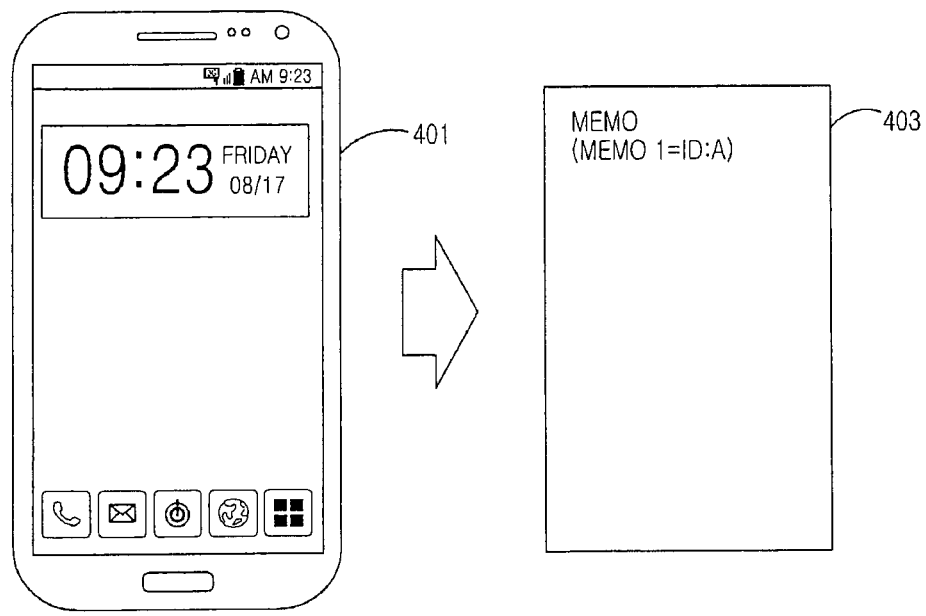
FIGS. 4A and 4B are illustrating an example operation for creating a memo screen in an electronic device according to an embodiment of the present disclosure.
Figure 4B:
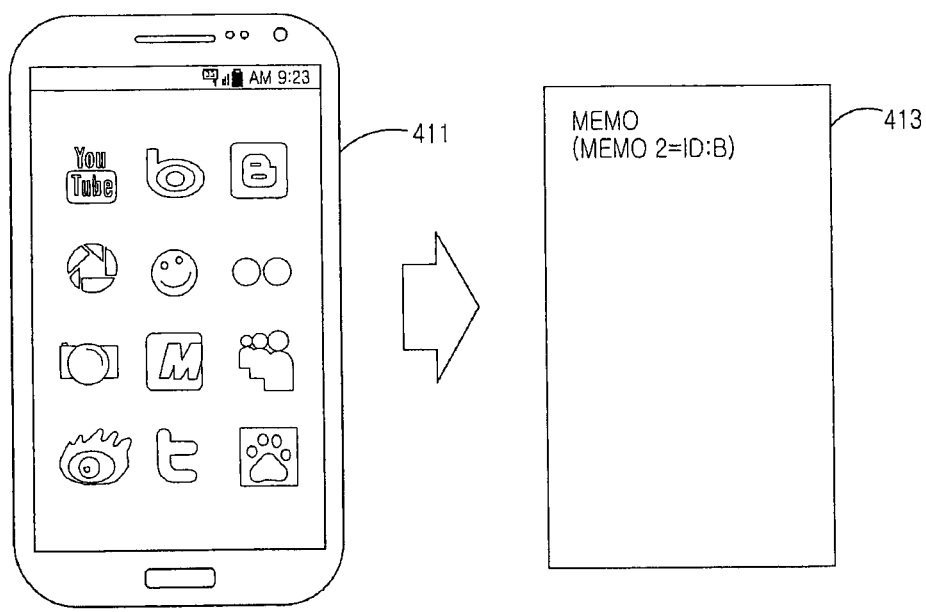

FIGS. 4A and 4B illustrate an example operation of creating a memo screen in an electronic device according to an embodiment.

Referring FIGS. 4A and 4B, the electronic device may manage a screen configuration for a displayed screen by using a screen identifier. Here, the managing of elements for the screen by using the screen identifier may be to display the screen including elements by using the identifier of the screen to be displayed. For example, when detecting a request for screen change in a currently displayed screen, the electronic device may display the changed screen by using an identifier of a screen corresponding to a change direction. Furthermore, the electronic device may create a memo screen to which an object for an input is addable for each screen. This means that a displayed screen and a memo screen corresponding to the displayed screen are mapped to each other and managed.

For example, the electronic device may create a memo screen for a home screen by using an identifier for the home screen as shown in FIG. 4A. At this point, when detecting an input for creating the memo screen is detected in a state where the home screen is displayed, the electronic device may create the memo screen. Such a situation may where an input for adding an object is detected in a state where the home screen is displayed.

The left screen of FIG. 4A is an example screen of the electronic device 401 that displays a home screen, and the right screen is a memo screen 403 created by using an identifier of the home screen. Such a memo screen 403 may be created as a layer displayed over any underlying layers (such as the home screen). The memo screen 403 may indicate the identifier of the home screen, as illustrated in FIG. 4A.

For another example, the electronic device may create a memo screen for an application list screen by using an identifier for the application list screen as illustrated in FIG. 4B. Here, the application list screen may be a screen created by a user of the electronic device, or may be a screen representing information on applications installed in the electronic device. At this point, the electronic device may create the memo screen when detecting an input for creating the memo screen in a state where the application list screen is displayed. Such a situation may be a situation that an input for adding an object is detected in a state where the application screen is displayed.

The left screen of FIG. 4B is a screen of the electronic device displaying the application list screen 411 and the right screen is a memo screen 413 created by using an identifier of the application list screen. Such a memo screen 413 may be created in a layer type. The memo screen 413 illustrated may include mean that an identifier of the application list screen.

As described above, the memo screen created by a screen identifier may be displayed together with a screen corresponding to an identifier assigned to each memo screen. That is, the electronic device may display memo 1 (a memo for a home screen) in a situation where the home screen is displayed, and memo 2 (a memo for the application list screen) instead of memo 1 may be displayed when the home screen is changed into the application list screen.

In addition, the home screen and application list screen may include a plurality of elements. The elements for the screens may be configuration objects such as icons or widgets configuring the screens and layouts which are regions in which the configuration objects are disposed. The electronic device may create a memo screen corresponding to each element as well as a memo screen corresponding to a screen.

For example, the electronic device may create a memo screen for a clock widget included in the home screen and move the memo screen together when the clock widget is moved to another screen.

Figures 5A, 5B, 5C:
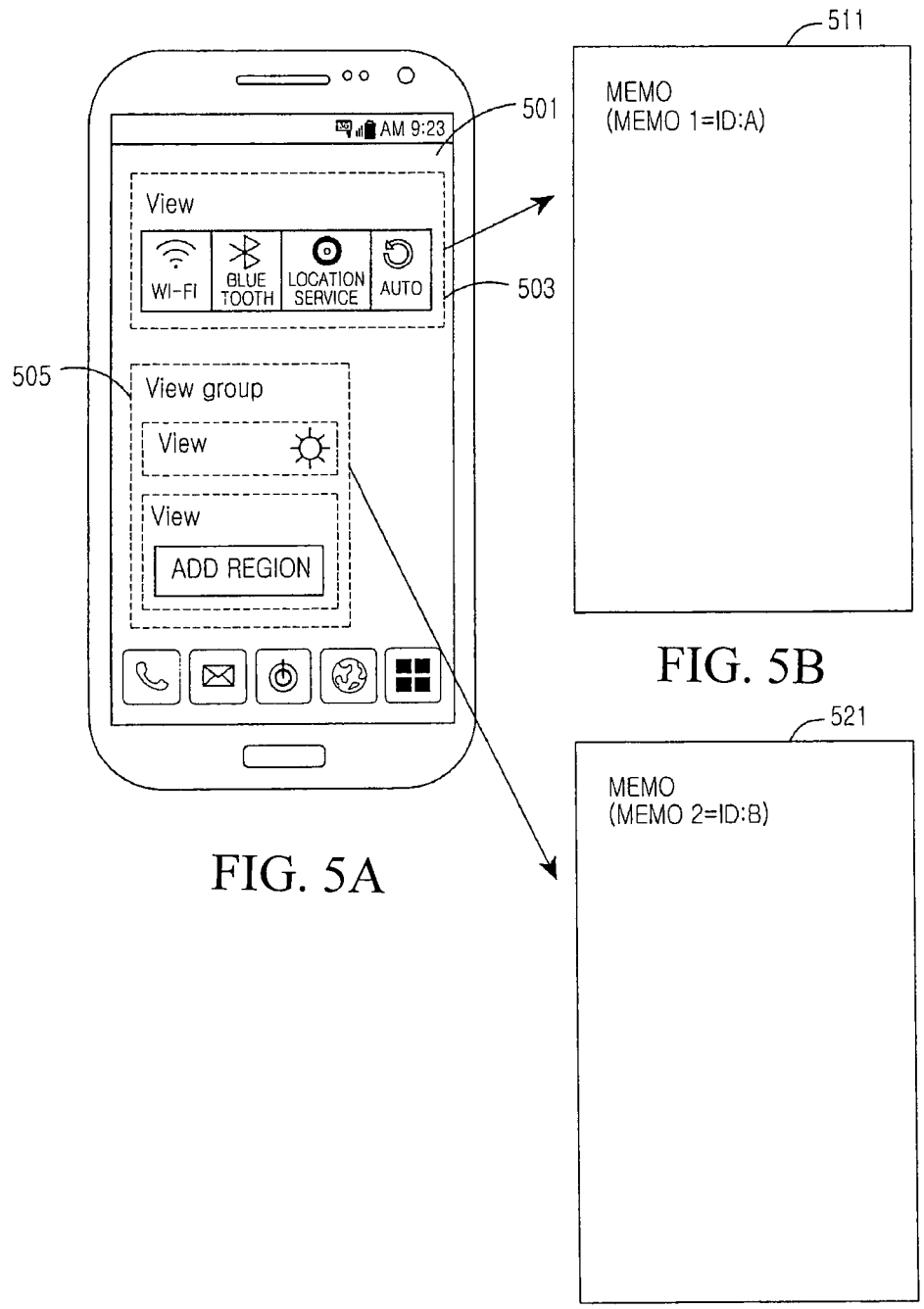
FIGS. 5A, 5B and 5C are illustrating an example operation for creating a memo screen in an electronic device according to an embodiment of the present disclosure.

FIGS. 5A to 5C illustrate views an operation of creating a memo screen in an electronic device according to an embodiment of the present disclosure.

Referring to FIGS. 5A to 5C, the electronic device may manage elements for a displayed screen by using an identifier. The elements for the screen may include configuration objects such as a button, text, and image included in a screen, and layouts included in the configuration objects. The configuration object may be represented as a view, and the layout may be represented as a view group, or a dock. In addition, the electronic device may assign an identifier to each configuration object and/or each layout and manage the configuration objects and/or layouts. In case of a typical home screen, for example, a home screen includes various icons and/or widgets for executing functions. These icons and/or widgets may be the configuration objects, and regions in which the configuration objects are disposed may be the layout.

For an example, a screen 501 as shown in FIG. 5A includes a setting menu 503 allowing a function such as wireless LAN, Bluetooth, location-based service, or screen rotation to be set, and a weather widget 505. These menu and/or widgets may be the configuration objects, and regions in which the configuration objects may be disposed may be the layouts.

In addition, a widget providing current weather information and a widget adding an area that weather information is provided area may be included in one layout. Furthermore, a user may add a memo to a configuration object such as the setting menu and/or widget. The addition of the memo to the configuration object may be to leave a message to the configuration object by using an input unit. In addition, the user may move a configuration object included in a screen to another position of the displayed screen or another page screen by an input such as a drag.

When a memo is created for the configuration object by using a memo screen mapped to an identifier for the screen and the configuration object is moved to another screen, the memo screen may be displayed on a screen before the configuration object is moved. Accordingly, the electronic device may create a memo screen for the configuration object. The electronic device may map an identifier for the configuration object to a memo screen.

That is, as shown in FIG. 5B, the electronic device may create a memo screen 511 for the setting menu 503 allowing the function such as wireless LAN, Bluetooth, location-based service, or screen rotation to be set. At this point, the electronic device may create a memo screen when an input allowing a memo screen for a configuration object to be created like the setting menu is detected. In this case, an input discriminated from an input selecting the configuration object or moving the configuration object to another position may be defined as an input for creating the memo.

FIG. 5B illustrates the memo screen 501 created by using an identifier of the setting menu, and may mean that an identifier of a configuration object is assigned to the memo screen 501. In addition, the electronic device may create a memo screen for a layout including a plurality of configuration objects as shown in FIG. 5C. At this point, the electronic device may create the memo screen when an input for creating the memo screen for the layout is detected. The above described input may be defined as a different input from the input defined in the electronic device.

FIG. 5C illustrates a memo screen 521 created by using an identifier of the weather widget 505, and may mean that an identifier of a layout is assigned to the memo screen 521. The electronic device may map the memo screen to the identifier of an element for the memo screen. Accordingly, although the configuration object and/or layout is moved to another screen, the electronic device may display a memo screen for the moved configuration object and/or layout.

FIGS. 6A to 6C are views illustrating an operation of creating a memo screen in an electronic device according to an embodiment.

Referring FIGS. 6A to 6C, the electronic device may manage a screen configuration for a screen displayed by using a screen identifier. For example, when detecting a request for screen change in a currently displayed screen, the electronic device may display a changed screen by using an identifier of a screen corresponding to a change direction.

The electronic device may define a screen identifier for a home screen 601 as shown in FIG. 6A. As illustrated, the home screen 601 includes a clock widget providing current time and a plurality of icons and/or widgets for executing functions. When detecting a request for displaying a home screen as the above-described, the electronic device may display a clock widget and a plurality of icons for executing functions by using a screen identifier. In addition, the electronic device may add an object 603 to the displayed screen according to an input as shown in FIG. 6B. At this point, the electronic device may create and display a memo screen 605 like FIG. 6C and then add an object 607 to the displayed memo screen 605.

In addition, the electronic device may create a memo screen in a layer type and may map an identifier 609 for the displayed home screen to the memo screen and stored the mapped identifier. That is, the electronic device may add an object corresponding to an input to a screen and then, as shown in the drawing, store an identifier of a screen from which an input for object addition is detected in the memo screen to which the object is added.

FIGS. 7A to 7C illustrate views an operation of memo display in an electronic device according to an embodiment of the present disclosure.

Referring to FIGS. 7A to 7C, the electronic device may create various screens such as a home screen, application list screen, application execution screen, and a lock screen, and such a screen may be changed by an input.

In addition, the electronic device may assign a screen identifier to each created screen, and map the screen identifier to a memo screen for each screen. In addition, the electronic device may detect an input and change a displayed screen. In addition, the electronic device may display together a memo screen corresponding to the displayed screen during displaying the screen. The electronic device may perform the following screen display operation. The electronic device may detect a user input for changing a currently displayed screen.

That is, as shown in FIG. 7A, the electronic device displaying a screen 701 configured with a flower image may detect a panning input 703 for screen change. In addition, when detecting the input for screen change as shown in FIG. 7B, the electronic device may change the screen into a screen 705 in a direction corresponding to an input. The drawing illustrates an operation of changing the screen configured with the flower image into a home screen 707.

In addition, the electronic device may display a memo (or a memo screen) corresponding to the changed screen at the same time as the screen change. The electronic device may create a memo screen for each screen and add an object corresponding to an input detected from the screen to the memo screen of the corresponding screen. The electronic device may map and store the object added memo screen to an identifier of the corresponding screen. The electronic device may display the memo (or memo screen) for a screen to be changed and displayed by using identifier information on the memo screen.

That is, as shown in FIG. 7C, when detecting a change into the home screen, the electronic device may confirm identifier information on the home screen, and call and display a memo screen mapped to the identifier information. A memo object "schedule confirmation" is thus added to a memo screen for the home screen and the memo screen is displayed 709 together during change into the home screen.

At this time, the memo screen may be displayed with a layer added on the home screen. Accordingly, the electronic device may control an output of the layer according to a user input and display or stop displaying the memo screen.

Figure 8C:
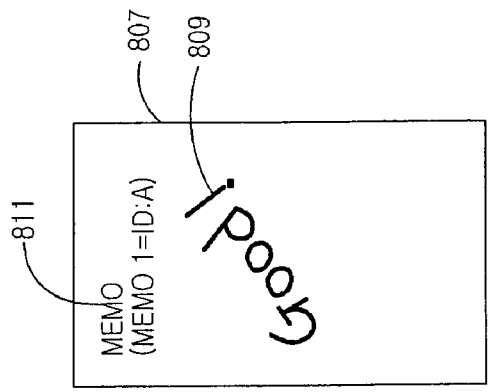
FIGS. 8A, 8B and 8C are illustrating an example memo display operation in an electronic device according to an embodiment of the present disclosure.
Figure 8B:
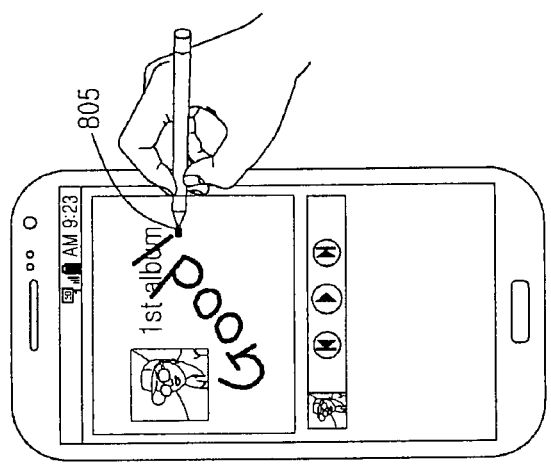
Figure 8A:
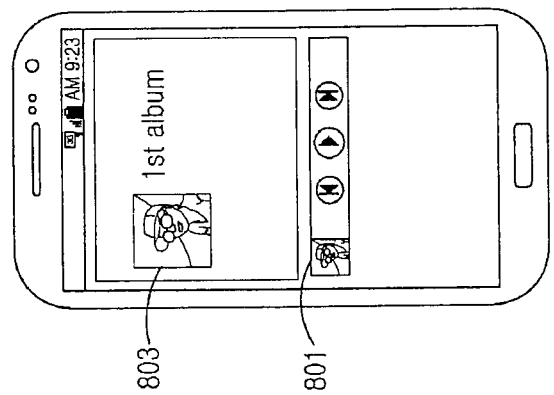

FIGS. 8A to 8C illustrate views an operation of memo display in an electronic device according to an embodiment of the present disclosure.

Referring to FIGS. 8A to 8C, the electronic device may provide a plurality of applications in relation to a game, scheduler, document preparation or multimedia playback.

In addition, the electronic device may assign a screen identifier for an application execution screen and map the screen identifier to a memo screen for each screen. In addition, the electronic device may detect an input for adding an object in a state where the application is executed and add an object for the input to a memo screen corresponding to the screen from which the input is detected.

When the application execution screen is displayed, the electronic device may display a memo screen mapped to an identifier of the displayed execution screen. The electronic device may perform the following screen display operation. The electronic device may detect an input for executing an application and display an application execution screen corresponding to the input.

That is, as shown in FIG. 8A, a multimedia playing screen configured with an album cover screen 803 and a control screen 801 may be displayed. The electronic device may define a screen identifier for the multimedia playing screen. Accordingly, when detecting a request for executing a multimedia playing application, the electronic device may display a playback screen configured with the album cover screen and the control screen by using the screen identifier.

In addition, as shown in FIG. 8B, the electronic device may add (in operation 805) a memo object to a displayed playback screen according to an input. At this point, the electronic device may create and display a memo screen 807 like FIG. 8C having an identifier 811 and then add (in operation 809) an object to the displayed memo screen.

In addition, the electronic device may create a memo screen in a layer type and map and store an identifier for the displayed playback screen to the memo screen. That is, the electronic device may add an object corresponding to an input on a screen to the memo screen and then store together an identifier of a screen from which an input for object addition is detected in the object added memo screen.

FIGS. 9A and 9B illustrate a memo display operation in an electronic device according to an embodiment of the present disclosure.

Referring to FIGS. 9A and 9B, the electronic device may create various screens such as a home screen, application list screen, application execution screen, and a lock screen. When the application is executed, the electronic device may change the displayed screen into the application execution screen.

In addition, the electronic device may assign a screen identifier to each created screen and map the screen identifier to a memo screen for each screen. In addition, the electronic device may change the displayed screen by executing an application. In addition, the electronic device may display a memo screen corresponding to the displayed screen during displaying the screen. The electronic device may perform the following screen display operation. The electronic device may detect a user input for executing an application.

That is, as shown in FIG. 9A, a home screen 901 may be displayed before executing the application. In this state, the electronic device may execute an application for the detected input. When detecting an input for requesting execution of a multimedia playback application, the electronic device, as shown in FIG. 9B, may display an application execution screen 903 and the memo screen 905 corresponding to the application execution screen 903. The electronic device may create a memo screen for each screen, add an object corresponding to an input detected on the screen to the memo screen of the corresponding screen, and call and display a memo screen mapped to an identifier for a changed screen.

FIGS. 10A to 10C illustrate an example operation of creating a memo screen in an electronic device according to an embodiment of the present disclosure.

Referring to FIGS. 10A to 10C, the electronic device may manage a screen configuration for a displayed screen by using a screen identifier. Here, the managing of configuration elements for a screen by using the screen identifier may be to display a screen including elements by using the identifier of a screen to be displayed. For example, when detecting a request for a screen change in a currently displayed screen, the electronic device may display a changed screen by using an identifier of a screen corresponding to a change direction.

In addition, the electronic device may create, for each screen, a memo screen to which an object for an input is addable. This means that a displayed screen may be mapped to the memo screen corresponding to the screen and managed.

The electronic device may detect an input in a predefined type and create the memo screen. Here, the creating of the memo screen means that a memo screen for object addition is displayed on a screen. When a touch input is detected which represents an object type, the electronic device may determine that an input for creating the memo screen is detected. For example, when a special input is detected pre-designated for displaying a memo screen (as distinguished from, for example, a pre-defined input for selecting an icon in a home screen, or a panning to change a screen), the electronic device may determine that an input for creating the memo screen is detected and display the memo screen.

In addition, the electronic device may detect an input for creating the memo screen through an input unit such as a trackball, thumb stick, electronic pen, mouse, voice or a specific input received by other sensors. For example, the electronic device may support the input unit of an electronic pen, and a button for executing a memo screen for adding an object may be prepared on the input unit. In addition, the electronic device may define a region in the displayed screen and determine an input detected in the defined region as an input for creating the memo screen.

That is, as shown in FIG. 10A, the electronic device may define a screen edge as a region in which a memo screen creation input is detected. Accordingly, the electronic device 1001 may determine that, when an input is detected in operation 1003 in the region, the memo screen creation input is detected. When the input for creating the memo screen is detected, the electronic device may display a memo screen in a layer type on the displayed screen. The electronic device creates a memo screen 1005 as shown in FIG. 10B, and then displays in operation 1009 the memo screen on a screen according to movement of the input 1007 as shown in FIG. 10C. The shaded region in FIG. 10A may represent an input for a displayed screen, and the shaded regions in FIG. 10B and/or FIG. 10C may thus represent a memo screen created by an input.

Figure 11C:
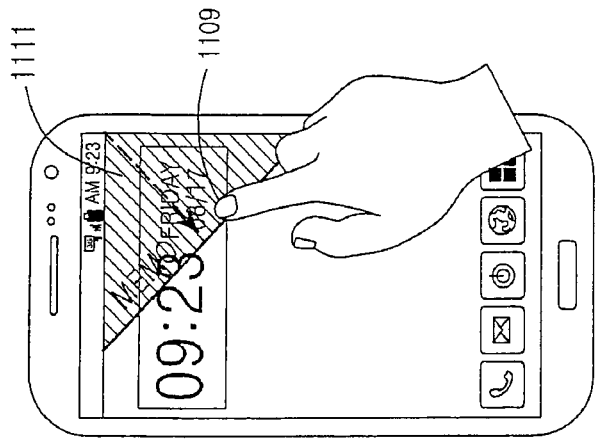
FIGS. 11A, 11B and 11C are illustrating an example operation of creating a memo screen in an electronic device according to an embodiment of the present disclosure.
Figure 11B:
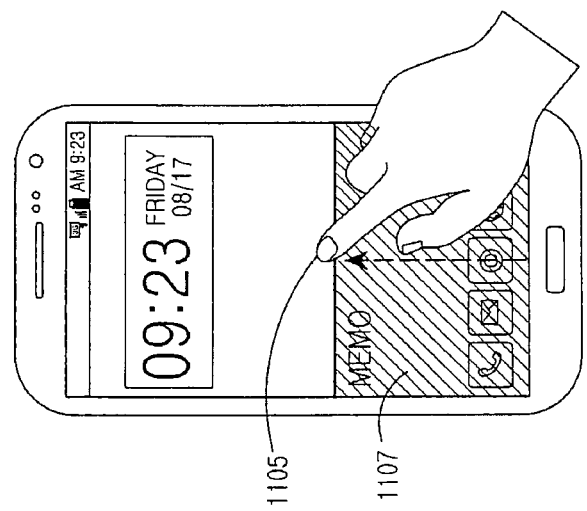
Figure 11A:
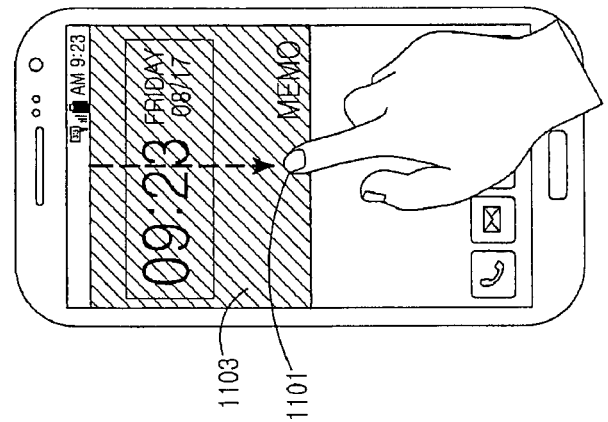

FIGS. 11A to 11C illustrate an operation of creating a memo screen in an electronic device according to an embodiment of the present disclosure.

Referring to FIGS. 11 to 11C, the example electronic device may detect an input and display a memo screen for a displayed screen. In one embodiment, an input in a predefined region may be used for an input for creating the memo screen. The electronic device may detect an input for the memo screen creation in a top, bottom, left, right and/or corner portion of the display.

For example, as shown in FIG. 11A, the electronic device may detect an input at the top portion of a screen and then create a memo input screen 1103 according to an input 1101 which is moved.

In addition, as shown in FIG. 11B, the electronic device may detect an input in the bottom portion and then create a memo input screen 1107 according to an input 1105 moved.

In addition, as shown in FIG. 11C, the electronic device may detect an input in the corner portion and then create a memo input screen 1111 according to an input 1109 which is moved.

Figures 12A, 12B:
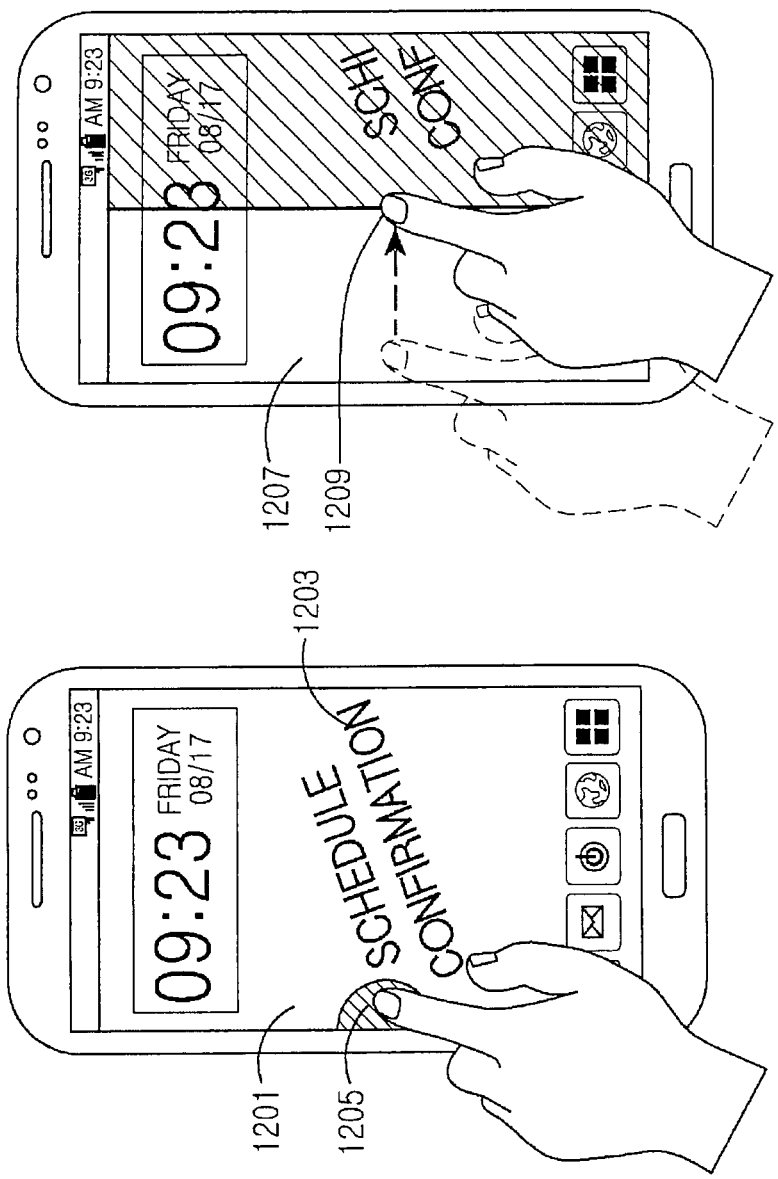
FIGS. 12A and 12B are illustrating an example operation of controlling a memo screen in an electronic device according to an embodiment of the present disclosure.

FIGS. 12A and 12B illustrate an operation of controlling a memo screen in an electronic device according to an example embodiment of the present disclosure.

Referring to FIGS. 12A and 12B, the electronic device may detect an input and display a memo screen for a displayed screen. The electronic device may allow the displayed memo screen to disappear from a screen according to a detected input. That is, as shown in FIG. 12A, the screen edge portion may be defined as a region in which an input for controlling the memo screen is detected. Here, the controlling of the memo screen may mean that the displayed memo screen is allowed to disappear from the screen. In addition, the controlling of the memo screen may be to copy the memo screen and map the copied memo screen to an identifier of another screen and/or a configuration object of another screen. This may be to apply an identical memo screen to a memo screen of another screen. In addition, the controlling of the memo screen may be to map a memo screen to an identifier of another screen and/or a configuration object of another screen. This may be to change an identifier assigned to the displayed memo screen.

That is, as shown in FIG. 12A, when detecting an input 1205 for removing a memo screen 1203 from display, the electronic device 1201 may stop displaying the memo screen according to an user input 1209 which moves the memo screen 1203, as illustrated in FIG. 12B. In A memo screen displaying a memo object "schedule confirmation" is moved rightwards according to the user input 1209 until it disappears from the screen 1207.

FIGS. 13A to 13C illustrate a screen control operation in an electronic device according to an embodiment of the present disclosure.

Referring to FIGS. 13A to 13C, the electronic device may detect an input and display a memo screen for a displayed screen. That is, as shown in FIG. 13A, when a wireless LAN setting screen 1301 is displayed, the electronic device may confirm an identifier for the wireless LAN setting screen and then confirm a memo screen corresponding to the identifier. The electronic device confirms the memo object corresponding to the wireless LAN setting screen 1301 and then displays the memo object 1303 on the wireless LAN setting screen 1301 as shown in FIG. 13B.

When an input is received changing the displayed wireless LAN setting screen 1301 to another screen, the displayed memo screen may be changed to display any memo objects corresponding to the changed screen. In addition, the electronic device may detect an input and scroll the displayed wireless LAN setting screen 1301, and the electronic device may also scroll a displayed memo screen 1307 along the scroll 1309 of the wireless LAN screen.

FIGS. 14A to 14C illustrate an operation of creating a memo screen in an electronic device according to an embodiment of the present disclosure.

Referring to FIGS. 14A to 14C, the electronic device may detect an input of an electronic stylus and create a memo screen.

The electronic pen described herein may have a configuration as shown in FIG. 14A. That is, the electronic stylus may be a pen-type stylus having a tip 1403 and a housing 1401 having a seating space. In addition, the electronic pen includes a button 1405 for creating the memo screen.

The housing 1401 includes an operating circuit generating a magnetic field of the electronic pen. Such an operating circuit may be a resonant circuit reacting to an electromagnetic field of the electronic device and generating the magnetic field. In addition, the button 1405 for generating the memo screen may generate an interrupt for creating the memo screen in a push/pull type. That is, the button 1405 may be pushed into the electronic pen or pulled outside according to a user input, as shown in states 1407 and 1409.

For example, in a state where the button of the electronic pen is pushed, the electronic device maintains the displayed screen 1411 as shown in FIG. 14B. When the button is pulled outside by the user, the electronic device may create and display a memo screen 1421 on the displayed screen as shown in FIG. 14C, represented by the shaded portion of the illustrated of FIG. 14C. The electronic device may also detect an input and resize the displayed memo screen. Here, the resizing the memo screen is to adjust magnification of the displayed memo screen and resize a horizontal and/or vertical size of the displayed memo screen.

FIGS. 15A to 15D illustrate an example operation of creating a memo screen in an electronic device in an electronic device according to an embodiment of the present disclosure.

The electronic device may create various screens such as a home screen, application list screen, application execution screen, and lock screen and, when executing an application, may change a displayed screen into the application execution screen. The electronic device may manage elements for the displayed screen by using an identifier.

The elements for the screen may include a configuration object such as a button, text, or image included in the screen and a layout included in the configuration object. The configuration object may be represented as a view, and the layout may be represented as a view group, or a dock. In addition, the electronic device may assign an identifier to each configuration object and/or each layout and manage the configuration objects and/or layouts.

The electronic device may add an object corresponding to an input to the displayed screen, namely, add an object such as a text, or figure to a memo screen corresponding to the screen, and the object may be added to a portion of the screen.

The electronic device may store a memo screen corresponding to a screen size and store, for another example, a memo screen having a minimum size of a region including an object.

In one example, the electronic device may obtain an image for a screen in a state where a memo screen to which an object is added is displayed and then cut a region designated by another input unit such as a user's finger or an electronic pen and store the cut region as a memo screen. In another example, the electronic device may display a plurality of pieces of information and then store a region of reference information, which includes a memo object.

Figure 15D:
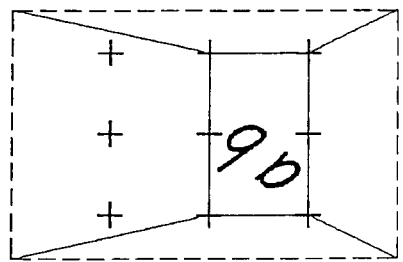
FIGS. 15A, 15B, 15C and 15D are illustrating an example operation for creating a memo screen in an electronic device according to an embodiment of the present disclosure.
Figure 15C:
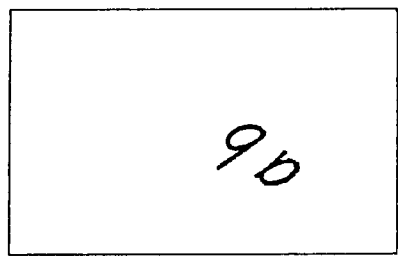
Figure 15B:
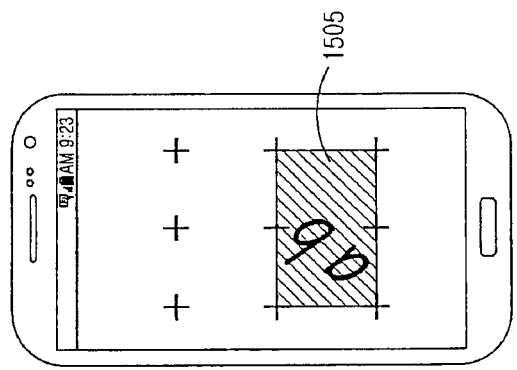
Figure 15A:
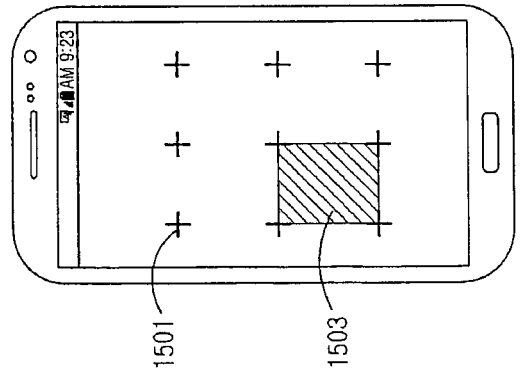

That is, as shown in FIG. 15A, the electronic device defines a plurality of cross type pieces of reference information 1501 and then define a region 1503 that may include an object added by the user. The electronic device may determine a size of the memo screen 1505 on the basis of the reference information as shown in FIG. 15B.

As described above, the electronic device, having determined the size of the memo screen, may adjust the size of the memo screen having a screen size as shown in FIG. 15C (e.g., a full screen size) into the determined size as shown in FIG. 15D. Since the screen size is resizable in various methods, the electronic device described herein may adjust the size of the memo screen by using various methods as well as the described embodiment.

FIGS. 16A and 16B illustrate screens of an example electronic device according to an embodiment of the present disclosure.

The electronic device may display a memo screen together corresponding to a screen during displaying the screen. When the memo screen corresponding to a displayed screen exists, the electronic device may display the memo screen on the displayed screen. In addition, when the memo screen corresponding to the displayed screen exists, the electronic device may display the existence of the memo screen on the displayed screen.

FIG. 16A illustrates a situation where a screen is displayed and a memo screen does not exist in an electronic device. The electronic device may thus display a home screen 1601 as illustrated in FIG. 16A.

Referring to FIG. 16B, the electronic device may display a memo screen corresponding to a screen together during displaying the screen. In addition, the electronic device may indicate the existence of the memo screen on a portion of a displayed screen 1603 via the indicator 1605, as shown, and then display the memo screen on the displayed screen when an input requested display of the memo screen is detected. The input may be made, for example, on the indicator 1605.

Figure 17:
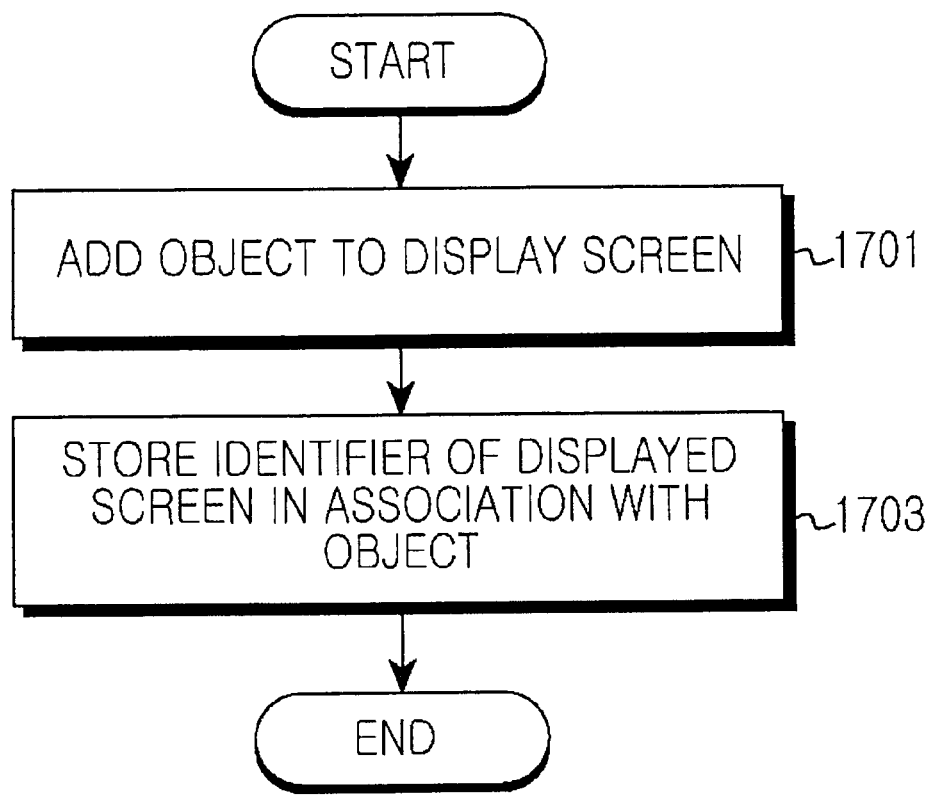
FIG. 17 is a flowchart illustrating an example display operation of an electronic device according to an embodiment of the present disclosure.

FIG. 17 is a flowchart illustrating a display operation of an electronic device according to an embodiment of the present disclosure.

Referring to FIG. 17, the electronic device may detect an input and perform an operation of adding an object to a displayed screen and an operation of storing an identifier of the displayed screen in association with the added object.

The electronic device may add an object input by a user's gesture in a state where a home screen, an application list screen, an application execution list, and a lock screen are displayed. When detecting the gesture for objection addition, the electronic device may create an object add screen and add an object corresponding to the input in operation 1701.

The electronic device may store an identifier of the displayed screen in association with the added object. The electronic device may confirm the identifier of the object add screen and store the identifier together with the added object in operation 1703.

The operation for storing the identifier of the displayed screen in association with the added object may include an operation of mapping the object to the entire or a portion of the screen and storing.

The displaying method of the electronic device may include an operation of retrieving and displaying a first object corresponding to a first screen during displaying the first screen, and an operation of calling and displaying a second object corresponding to the second screen during displaying the second screen.

The operation of detecting the input and adding the object to the displayed screen may include an operation of displaying an object add screen to which the object is addable, and the object add screen may be stored in association with a screen identifier.

The object add screen may be controlled according to an input, and the controlling of the object add screen may include at least any one of stopping display, moving to another screen, copying to another screen, scrolling, and resizing.

The displayed screen may include information representing existence of the added object.

Each of the above-described elements of the electronic device according to the embodiments may be configured with one or more components and a name of a corresponding element may be differed according to a kind of the electronic device. The electronic device according to the embodiments may be configured with at least one of the above-described elements, some of the elements may be omitted, or additional other elements may be further included. In addition, some of elements of the electronic device according to the embodiments are combined to be one entity and the entity may perform the same functions of the corresponding elements before the combination.

A term element used herein, for example, "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), or a programmable-logic device performing certain operations already known or to be developed.

According to various embodiments, some of devices (for example, modules or functions thereof) or methods (for example, operations) may be implemented with instructions stored in a computer-readable storage medium in a programming module type. When the instructions are executed by one or more processors, the one or more processors may perform functions corresponding to the instructions. The computer-readable storage medium may be, for example, a memory. At least some of the instructions may be implemented (for example, executed) by the processors. At least some of the programming modules may include, for example, modules, programs, routines, instruction sets, or processes for performing one or more functions.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure.

Modules or programming modules according to the present disclosure may include at least one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

According to various embodiments, in a storage medium storing instructions, the instructions, when executed by at least one processor, are set to allow the at least one processor to perform at least one operation. The at least one operation includes detecting an input and adding an object to a displayed screen, and storing an identifier of the displayed screen in association with the added object.

According to various embodiments, in an electronic device, a memo screen may be created and stored for each screen and the screen may be displayed together with the memo screen corresponding to the screen.

While the disclosure has been shown and described with reference to certain example embodiments thereof, it will be understood by those skilled in the art that various changes in form and details may be made therein without departing from the ambit of the disclosure as defined by the appended claims. Therefore, the ambit of the disclosure is defined not by the detailed description of the disclosure but by the appended claims, and all differences within the ambit will be construed as being included in the present disclosure.

What is claimed is:

1. An electronic device comprising:
   a display; and
   a processor, operatively coupled to the display, configured to:
      control to display a first screen in which a configuration object is displayed in a layout;
      control to display, in response to detecting a first input for activating a memo object input mode, a translucent memo screen that is superimposed on the first screen being displayed;
      receive, via the memo screen being displayed, a memo object associated with the first configuration object being displayed;
      store first information including an identifier for uniquely associating the memo object with the configuration object and second information regarding the memo object; and
      in response to a second input to change the displayed layout, move the configuration object displayed on the display by a distance and move the memo object displayed on the display by the same distance.

2. The device of claim 1, wherein the processor is further configured to:
   display, in response to detecting a third input from a user, a second screen distinct from the first screen;
   in response to detecting a fourth input from the user for switching the second screen to the first screen, identify the memo object associated with the first screen by using the identifier included in the first information; and
   display the memo object that is superimposed on the first screen.

3. The device of claim 1, wherein the processor is further configured to:
   terminate, in response to detecting the first screen is switched to a second screen, to display the memo object.

4. The device of claim 1, wherein the first screen associated with the memo object accompanies, based on the identifier included in the first information, the memo object.

5. The device of claim 1, wherein the first input is associated with a state of a physical button included in an input means, and wherein the input means is associated with the electronic device.

6. The device of claim 1, wherein the processor is further configured to:
   in response to receiving the memo object, display the memo object within the memo screen superimposed on the first screen.

7. The device of claim 1, wherein the first screen comprises one of a home screen, an application execution screen, and a lock screen, and
   wherein the memo object comprises at least one of a figure, a number, a text, or a multimedia content.

8. The device of claim 1, wherein the processor is further configured to:
   adjust a size of the memo screen based on a user input.

9. A method of an electronic device, the method comprising:
   displaying a first screen in which a configuration object is displayed in a layout;
   displaying, in response to detecting a first input for activating a memo object input mode, a translucent memo screen that is superimposed on the first screen being displayed;
   receiving, via the memo screen being displayed, a memo object associated with the configuration object being displayed;
   storing first information including an identifier for uniquely associating the memo object with the configuration object and second information regarding the memo object; and
   in response to a second input to change the displayed layout, moving the configuration object displayed on the display by a distance and moving the memo object displayed on the display by the same distance.

10. The method of claim 9, further comprising:
    displaying, in response to detecting a third input from a user, a second screen distinct from the first screen;
    in response to detecting a fourth input from the user for switching the second screen to the first screen, identifying the memo object associated with the first screen by using the identifier included in the first information; and
    displaying the memo object that is superimposed on the first screen.

11. The method of claim 9, further comprising:
    terminating, in response to detecting the first screen is switched to a second screen, to display the memo object.

12. The method of claim 9, wherein the first screen associated with the memo object accompanies, based on the identifier included in the first information, the memo object.

13. The method of claim 9, wherein the first input is associated with a state of a physical button included in an input device, and wherein the input device is associated with the electronic device.

14. The method of claim 9, further comprising:
in response to receiving the memo object, displaying the memo object within the memo screen superimposed on the first screen.

15. The method of claim 9, wherein the first screen comprises one of a home screen, an application execution screen, and a lock screen, and
wherein the memo object comprises at least one of a figure, a number, a text, or a multimedia content.

\* \* \* \* \*